United States Patent [19]

Thompson et al.

[11] 4,095,638

[45] Jun. 20, 1978

[54] MANUFACTURING OF INNER TUBES FOR TIRES

[75] Inventors: Donald R. Thompson; Paul R. Matvey, both of Akron; William J. Hampshire, Peninsula, all of Ohio

[73] Assignee: The Goodyear Tire & Rubber Company, Akron, Ohio

[21] Appl. No.: 669,372

[22] Filed: Mar. 22, 1976

Related U.S. Application Data

[62] Division of Ser. No. 561,817, Mar. 25, 1975, abandoned.

[51] Int. Cl.$^2$ .............................................. B29H 15/00
[52] U.S. Cl. ................................... 152/349; 156/118; 156/242; 156/501
[58] Field of Search .................. 156/110 R, 118, 119, 156/120, 121, 122, 394, 414, 242, 245, 246, 500–503, 187, 203, 429, 431, 446; 264/129; 425/90, 92, 101, 103; 152/349, 350

[56] References Cited

U.S. PATENT DOCUMENTS

| | | | |
|---|---|---|---|
| 1,608,393 | 11/1926 | Henderson | 156/118 |
| 2,033,962 | 3/1936 | Waber | 156/118 |
| 2,372,382 | 3/1945 | Krusemark | 156/119 |
| 2,514,183 | 7/1950 | Chandley | 156/119 |
| 2,559,591 | 7/1951 | Burkley | 156/119 |
| 2,568,848 | 9/1951 | Enabnit | 156/118 |
| 3,083,133 | 3/1963 | Hansen et al. | 156/246 |
| 3,321,346 | 5/1967 | Powell | 152/349 |
| 3,687,765 | 8/1972 | MacLean et al. | 156/187 |
| 3,811,983 | 5/1974 | Rowland | 156/242 |

Primary Examiner—David Klein
Assistant Examiner—John E. Kittle
Attorney, Agent, or Firm—R. S. Washburn

[57] ABSTRACT

Self-curing elastomeric compounds in liquid suspension are sprayed onto a warmed rotating former having preferably a form developed from the radial dimensions of the inner tube to be made. The tube is cured and complete on the form by transposing one end of the sleeve to the opposite axial end of the former where the one end is seamed to the other end of the sleeve. Both the process and the tube produced by the process have advantages in manufacturing cost, in material saving, and at least equal quality performance relative to conventional inner tubes and methods of making them.

10 Claims, 4 Drawing Figures

U.S. Patent  June 20, 1978  4,095,638
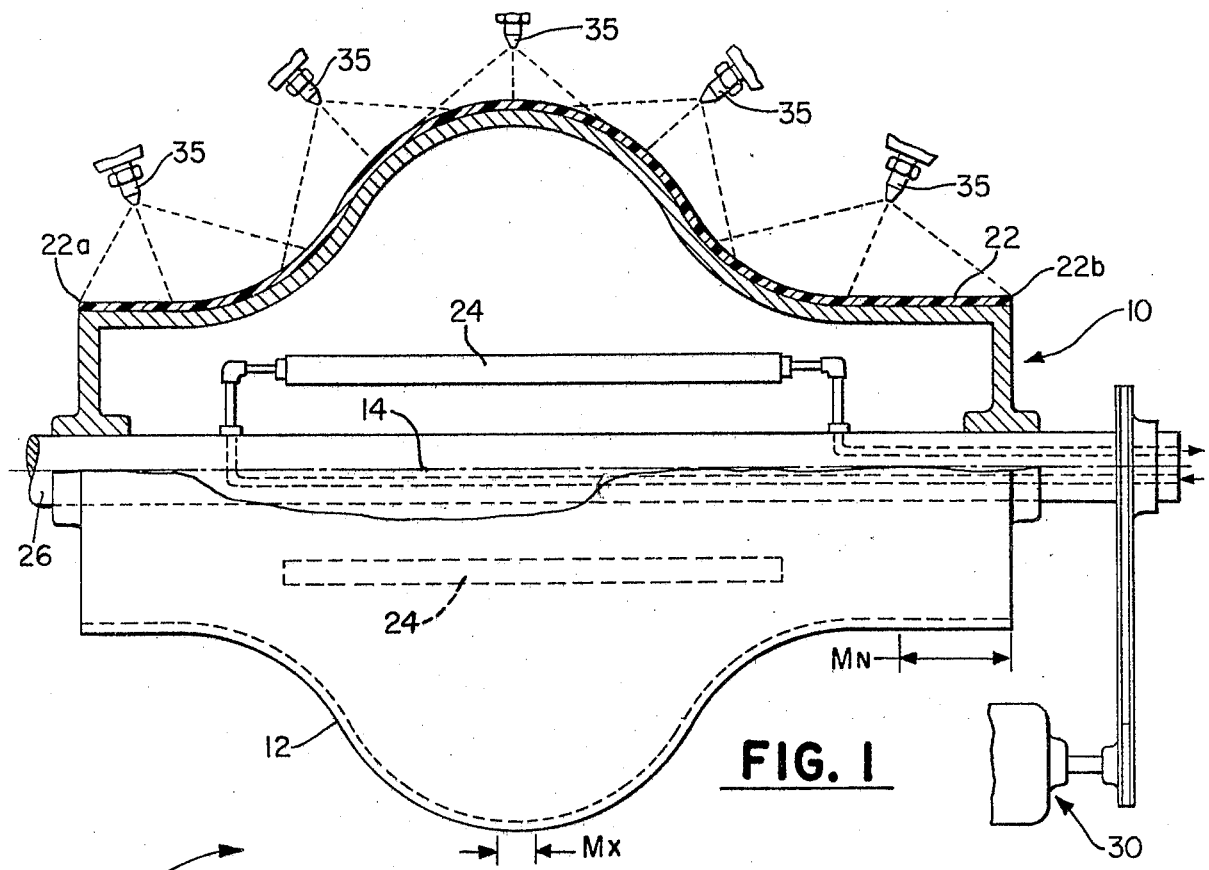
FIG. 1
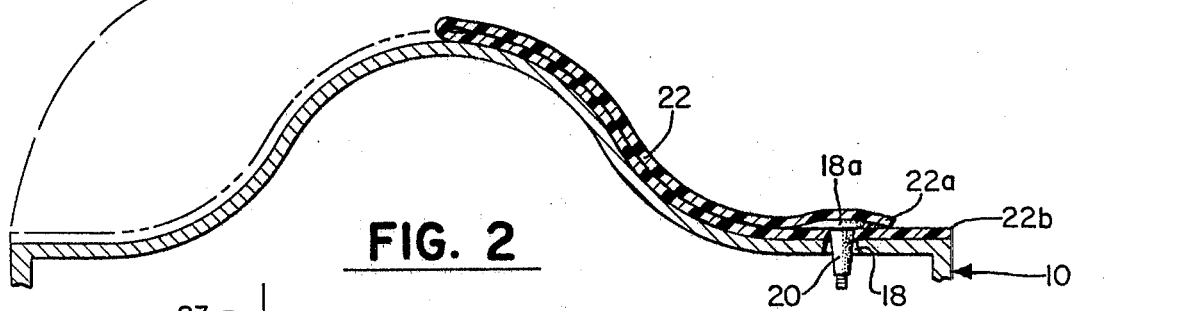
FIG. 2
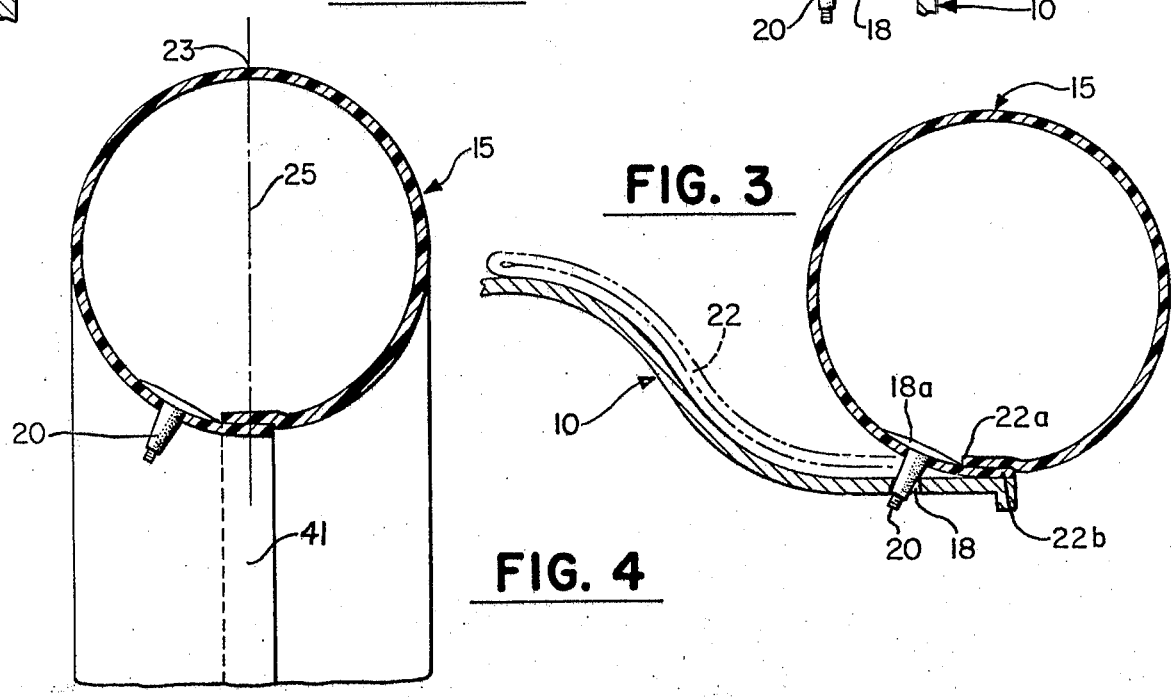
FIG. 3
FIG. 4

MANUFACTURING OF INNER TUBES FOR TIRES

This is a division of application Ser. No. 561,817 filed Mar. 25, 1975, now abandoned.

The foregoing abstract is not to be taken as limiting the invention of this application, and in order to understand the full nature and extent of the technical disclosure of this application, reference must be made to the accompanying drawing and the following detailed description.

This invention relates to inner tubes for vehicle tires and to like endless inflatable toroidal articles. In particular, the invention relates to improvements in manufacturing such articles, and to an improved inner tube.

Conventionally, inner tubes for motor vehicle tires are manufactured by extruding a running length tube of uncured rubber compound, cutting off an appropriate length of such tube, inserting a suitable air valve, coiling the cut off length of tube to join the two cut ends of the length to form a splice about the circumference of the transverse cross-section of the tube, and finally inflating the inner tube in a rigid heated mold to cure the uncured rubber compound.

Primary objects of the present invention are to provide an improved inner tube, a method of an apparatus for manufacturing such improved inner tube for vehicle tires at lower cost than heretofore.

Briefly stated, and in accordance with one aspect of the invention, the foregoing and other objects and advantages are achieved by a method of making an innertube comprising rotating a former about an axis, spraying a self-curing elastomeric composition in liquid suspension onto the surface of a former as the latter rotates to form an homogenous, single layer sleeve on the former, drying the sleeve to a non-tacky, elastic state while the sleeve remains on the former, transposing one circular edge of the cured sleeve axially over an intermediate portion of the sleeve to a position on the sleeve near its other edge, then joining the two edges of the sleeve to form a toroid, and then removing the cured tube from the former.

In a further aspect of the invention, there is provided an arrangement of apparatus particularly adapted for the practice of the aforedescribed method, which apparatus includes a former having a rigid surface, means for heating the surface of the former, a plurality of spray nozzles mounted and oriented in spaced relation with the surface of the former to spray a self-curing composition in liquid suspension onto the surface of the former, and drive means to rotate the former at a predetermined speed about its own axis.

According to another aspect of the invention, there is provided an innertube for a vehicle tire comprising a continuous, homogenous, single layer sleeve having opposed edge portions joined to form a toroid with said edge portions defining a seam extending circumferentially of the toroid near the minimum radius thereof.

In order to acquaint persons skilled in the related art with the principles and features of the invention, certain preferred embodiments thereof, by way of example, are described by and with reference to the annexed drawings in which:

FIG. 1 is a schematic illustration of an apparatus in accordance with the invention;

FIGS. 2 and 3 are partial views, in cross-section, of the former of FIG. 1, and intermediate stages of the process according to the invention;

FIG. 4 is a view in cross-section of an inner tube for a vehicle tire, in accordance with the invention.

Referring to the drawings, and particularly to FIG. 1, the method according to the invention employs a former 10 which is provided with a rigid surface 12 of revolution, the generatrix of which is a curve revolved about an axis 14 coplanar with the generatrix. While the rigid surface of the former can be a right circular cylinder, we prefer that the generatrix of the surface be a line somewhat analogous to the "bell curve", sometimes referred to as a "normal distribution curve" (of statistical data). The profile length of the generatrix or generating line is equal to the developed length of the cross-section periphery of the inner tube 15 (FIG. 4). In addition, the radial distance from the axis 14 to the generatrix at successive increments of curve length along the profile thereof corresponds to the radial distance of the corresponding increments of the periphery of the inner tube 15 from its own rotational axis. While the profile and particular size of the former is theoretically that of one size of inner tube, it can as a practical matter be employed to make tubes suitable for several different tire sizes. It will be understood, therefore, that either the profile length of the generating line or the successive radial distances thereof from the axis need not be exactly equal to the corresponding measurements of a tube to be made, but will closely approximate such dimension for one selected size of tube.

We have determined further that the relation of the maximum diameter to the minimum diameter of the former 10 should not exceed about 2 to 1. For fabrication of innertubes in accordance with the invention, which innertubes have outside to inside diameter ratios of 2 to 1 and greater, the former 10 is provided with a surface 12 generated as a "bell curve" in which, as before, the profile length of the generatrix is equal in length to the periphery of the cross-section of the innertube. However, the radial distance from the axis 14 to the generatrix at successive increments of the curve length along its profile is made proportional to the radial distance of corresponding increments of the cross-section periphery of the innertube.

In any case, the minimum diameter, at M$n$, of the former 10 corresponds to the inner diameter of the innertube to be formed thereon. The maximum diameter of the former, at M$x$, is equal to or less than the outer diameter of the innertube. Measurements of the innertube 15 are referred to its air-filled but unstretched condition.

The cylindrical surface portion of the former, at M$n$, extends axially outwardly from the "bell curve" as defined above to the end of the former 10, sufficiently to accommodate the operation of making a circumferential seam as will presently be described.

Innertubes having cross-sectional peripheries other than circular can also be made by methods and apparatus according to the invention. In such cases, the profile of the former is prepared in the same manner as described herein, although such profiles may not be so aptly described as a "bell curve", as in the preferred embodiment set forth herein.

The former 10 can be constructed of any suitable rigid material which material is not a feature of the invention. However, a former 10 constructed of aluminum has been found satisfactory. In addition, the former can when desired be treated with a release coating capable of facilitating the separation of a self-cured composition sleeve 22 from the former as presently will be described.

The otherwise smooth surface 12 of the former 10 is provided with a recess 18 which is sized and located to accommodate a valve 20 inserted through the sleeve 22. The recess can be provided with means to close the same during the building up of the sleeve on the surface of the former. The recess is located in the former at a distance along the profile of the "bell curve" from its axial mid-point corresponding to the distance from the point 23 on the mid-circumferential plane 25 of the inner tube, and along the periphery of the tube cross-section, to the valve location therein. The former 10 is, in accordance with the invention, preheated externally to a surface temperature of about 120° to 210° F. It can additionally or alternatively be heated internally by known means such as the heaters 24 by circulating hot fluid therein or by suitable electrical resistance elements therewithin.

The former 10 is mounted for rotation on a shaft 26 supported in conventional bearings (not shown). Drive means 30 are connected to the shaft to rotate the former 10 at an adjustably fixed speed such that the speed of the former can be adjusted to a fixed rate of from 5 to 50 revolutions per minute. As presently will appear, it is desirable that the surface speed of the former be coordinated with the time rate of cure of the self-curing composition.

The surface speed of the former 10, in rotation, is determined in accordance with the rate of deposition of the self-curing composition on the former and with the time-temperature characteristics of the composition selected. The maximum surface speed is limited sufficiently to avoid centrifugal force sufficient to disturb the sleeve during its buildup on the former. By way of illustration, an 840/800×6 inner tube suitable for light aircraft landing wheels has been produced in accordance with the invention on a former 10 at about 40 rpm, i.e., at about 230 surface feet per minute at the M$x$ diameter.

The former is disposed in an enclosure (not shown) having means to provide circulation of drying air. The enclosure can in addition to the circulation of drying air, be provided with additional heating means, for example, infrared lamps, by which the rate of drying of the self-curing composition can be enhanced. The heat supplied, while sufficient to dry the sleeve, is in any case not sufficient to alter the cure rate of the composition until the composition is dried. Temperatures used are from 170° to 210° F. After drying the sleeve, the curing rate can be accelerated by increased temperatures up to about 320° while the sleeve remains on the former.

As will become apparent, it is desirable that the rate of external heat input and the moisture evaporation be coordinated with the time rate of cure of the composition so that the entrapment of vehicle, particularly water, within the material of the sleeve be minimized.

The apparatus further includes spray guns 35 which are preferably supported in fixed relation to the former. Spray guns of the type used herein are readily available, for example, from the DeVilbiss Company of Toledo, Ohio, whose Automatic Model AGB-504 has proven satisfactory.

Recirculating facilities are provided in order that self-curing composition in liquid suspension can be delivered to the gun nozzle and sprayed onto the former or alternatively recirculated to the supply of the composition in suspension so as to minimize or avoid any clotting or coagulation thereof at the gun nozzles. The guns 35 are themselves arranged to spray a suitable self-curing composition in liquid, preferably water, suspension onto the surface of the drum in an overlapping pattern so as to achieve an essentially uniform deposit on the surface in a manner well known in the spraying arts.

Suitable commercially available pumping and mixing means (not shown) are connected to supply the composition in suspension to the guns. The liquid pressures as delivered to the spray nozzles are preferably in the range of from 3 to 20 psi while the air pressure at the nozzlees is in the range of 30 to 70 psi. Each spray gun 35 will deposit, on the former, composition at a rate of from 40 to 130 grams per minute.

In accordance with the invention, a solution or suspension of prevulcanized natural or synthetic rubber elastomeric compound is sprayed onto the preheated surface of the former while the same is rotated at constant speed in the enclosure.

Suitable compositions can include natural and/or synthetic rubbers, and the like, as well as cure accelerators commonly available. The particular compositions used are not within the scope of the invention claimed herein. Compositions eminently suitable for use in the practice of the invention are described and claimed in an application for Composition of matter and Inner Tubes Made Therefrom by Paul R. Matvey, Ser. No. 561,818, filed on even date herewith, and hence need not be further described here.

The composition is carried to the spray guns for delivery to the surface of the former in a suitable liquid vehicle which can be an aliphatic or aromatic, but is for economy, ease, and safety, preferably water. In water suspension, a solids range of from 55 percent to 65 percent of elastomeric composition is found satisfactory.

The composition must have a sufficiency of curing accelerator to permit adequate degree of cure to be completed while the sleeve being formed remains on the former. On the other hand, the cure accelerator should not be sufficient to allow the formation on the former of separable film layers or laminae and particularly not sufficient to allow the cure to proceed to an extent such as to prevent integral interfilm bonding necessary to the formation of a unitary continuous homogenous sleeve 22 on the former.

The cure accelerator fraction in the composition must be related to the speed of rotation of the former as well as to the temperature thereof so that at successive revolutions of the former the composition sprayed thereon can bond integrally with the latex already deposited thereon.

The radial thickness of the sleeve built up on the former is determined within close limits by the relation between the speed of the former 10 and the rate of delivery of latex from the spray guns. It has been found that a sleeve thickness can be controlled within limits from plus to minus 0.007 inches or less and that the total radial thickness of the tube can be reduced from one-third to one-half the thickness of the conventional innertube without loss of function or quality.

The wall thickness of the sleeve can be uniform in all areas thereof. By manipulations of the weight rate of flow of the composition from the individual spray guns, more or less thereof can be deposited on the former surface so as to form circular zones of greater or lesser wall thickness in the sleeve on the former.

When the desired thickness of sleeve has been deposited by the spray guns 35 on the surface of the former 10, delivery of the composition in suspension to the surface is shut off. The former can and preferably continues to rotate while the curing of the composition is allowed to proceed at least sufficiently to detackify the surface of the sleeve 22, and become sufficiently elastic to permit the seaming operation about to be described.

The valve 20 is then pushed through the sleeve into the recess 18 and its flange is adhered to the outward surface of the sleeve. The air passage of the valve is in no way obstructed and does not require a later operation to provide an open passage.

To form the closed contour annular tube, one edge 22a of the sleeve 22 is raised radially at least a slight distance from the surface 12 of the former and moved in an axial direction over the intermediate, and enlarged diameter portion of the sleeve and then relaxed circumferentially snugly on the other circumferential edge 22b as is illustrated in FIG. 2. Preferably, the one edge 22a is disposed to cover the flange 18a of the valve. The now outward surface of the one edge 22a and the corresponding surface of the other edge 22b are then treated with a commercially available adhesive such as MMM Scotch Grip 1300, available from MMM Co., St Paul, Minn.

Then, the closed contour of the tube is inflated by compressed air at low pressure. Surprisingly, the edge 22a turns about, reversing itself, as seen in FIG. 3, so as to dispose the adhesive-coated surfaces adjacent the two edges 22a,22b in direct face-to-face contact as the tube assumes a toroidal form. The pressure within the toroid is sufficient to press the coated edges to complete the seam extending circumferentially about the former. The innertube is thereupon complete and ready for use.

A number of advantages are particularly made available in the practice of the invention. The manufacture of quality innertubes can be carried out in a relatively simple continuous process without, as heretofore, requiring the milling, calendering, or extruding of compounds, the latices useful herein being readily prepared by conventional techniques of mixing and delivery in liquid form. Regulation of thickness of the innertubes is accomplished effectively to closer limits than heretofore available and the weight of a finished tube equivalent in quality to the conventional practice is reduced by from one-half to one-third. The innertubes according to the present invention are complete, ready for use, on the former and do not as heretofore require cure in a mold at high temperature and pressure, nor the attendant storage and handling of the tube to and from such mold curing treatment. The tube produced in accordance with the invention is provided with a circumferential seam located in a minimum stress area of the tube; i.e. at or near the minimum radius of the toroid and is circumferentially more uniform in mass and dimension in contrast with the conventional transverse splice which inevitably has at least a slight circumferential irregularity undesired in the use of the innertubes.

The inner tube according to the invention, being thinner in gauge and lighter in weight than the heretofore available inner tube contributes to lower temperatures in operation of the tube and the tire on a vehicle in use.

In addition, the seam formed by the two circumferential edges of the sleeve is disposed at or close to the minimum diameter of the tube and not at the maximum diameter of the tube. Thus, the seam in the inner tube according to the present invention is made where the longitudinal, that is, circumferential stresses due to inflation are minimum, whereas seams disposed radially outward at or near the maximum circumference are subjected to stresses very near to the maximum in use.

Also, because of the preferred contour of the former on which the tube is made, the wall of the innertube, when inflated, is stressed more nearly equally at the radially inner and radially outer circumference of the inner tube itself. Thus, the rate of elongation of a circumference of the tube is independent of the radius of the tube.

While certain representative embodiments and details have been shown for the purpose of illustrating the invention, it will be apparent to those skilled in the art that various changes and modifications may be made therein without departing from the spirit or scope of the invention.

What is claimed is:

1. The method of making an inner tube for a vehicle tire comprising rotating a rigid former about an axis, spraying a self-curing elastomeric composition in liquid suspension on the surface of the former while the latter rotates to form on the surface a continuous, homogenous, single layer sleeve, drying the sleeve to a nontacky elastic state while the sleeve remains on the former, transposing one circular edge of the sleeve axially over the intermediate portion of the sleeve to a position on the sleeve near its other edge, then joining the two edges of the sleeve to form a closed toroid, and then removing the cured toroidal tube from the former.

2. The method as claimed in claim 1, including inserting a valve having a flange and a stem through said sleeve to dispose the flange on the exterior surface of said sleeve, which becomes the interior surface of the tube, and the stem through the sleeve and into a recess provided in the former.

3. The method as claimed in claim 1, applying heat to said former to dry said sleeve on the former, including preheating said former to a temperature of from about 120° F. to about 210° F.

4. The method as claimed in claim 1, applying heat to said former to dry said sleeve thereon, including heating the former by means of heating elements disposed therewithin.

5. The method as claimed in claim 1, including, after moving said one edge, applying a splicing adhesive to the exposed surfaces of the cured sleeve adjacent said one edge, and then disposing the adhesive-coated edges in direct face-to-face contact to form a circular seam circumferentially of the former to form a closed annular tube on said former before removal of said tube from the former.

6. The method as claimed in claim 1, comprising placing a valve to pass inflating air through the sleeve, disposing said one edge on the sleeve adjacent to and axially inwardly of said other edge to form an annular tube, then applying to the then radially outward surfaces of both edges a splicing adhesive, and turning the one edge about itself to dispose said radially outward surfaces in face-to-face contact with adhesive therebetween by inflating said tube to toroidal form, whereby a seam is formed in said innertube before removal thereof from the former.

7. An apparatus for making an innertube for a vehicle tire, comprising a former defined by a bell-shaped curve revolved about the axis of the former, said curve having a contour length corresponding to the length of the periphery of a transverse cross-section of said tube and successive increments of said contour length being distant from said axis equally with respect to the radial distance of corresponding increments of said periphery from the axis of said innertube.

8. The apparatus as claimed in claim 7, wherein said surface is additionally defined by a cylindrical portion extending between said curve and an axial end of said former, and a valve stem accommodating recess extending inwardly of said cylindrical portion.

9. The apparatus as claimed in claim 7, wherein the surface of said former is defined by a curve revolved about the axis of the former, said curve having a contour length corresponding to the length of the periphery of a transverse cross-section of said tube and successive increments of said length being radially distant from said axis by a measurement equal to the sum of the minimum radius of said tube plus a measurement proportional to the radial distance of the respectively corresponding increments of said periphery from said minimum radius.

10. A toroidal innertube ready for use in a vehicle tire, made by the method of claim 1, and comprising a circumferentially endless single layer sleeve having the visible characterizing properties of a continuous homogenous precured rubbery material and having continuous distinct and unfused circumferential edge portions and free of any mold impression effect, an adhesive layer superposed on and between said edge portions, said edge portions and said adhesive layer defining a lap seam in which said unfused edge portions remain unfused bu adhesively attached to the respectively proximate portions of the sleeve, said seam extending circumferentially of the tube adjacent its inner diameter, said innertube having wall thickness and weight both less by at least one-third than the wall thickness and weight of a conventional innertube for a tire of like size.

* * * * *